(12) United States Patent
Yu

(10) Patent No.: US 8,902,587 B2
(45) Date of Patent: Dec. 2, 2014

(54) SUPPORT APPARATUS AND ELECTRONIC DEVICE EMPLOYING THE SUPPORT APPARATUS

(71) Applicants: Fu Tai Hua Industry (Shenzhen) Co., Ltd., Shenzhen (CN); Hon Hai Precision Industry Co., Ltd., New Taipei (TW)

(72) Inventor: Wen-Hua Yu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 138 days.

(21) Appl. No.: 13/692,914

(22) Filed: Dec. 3, 2012

(65) Prior Publication Data

US 2013/0161479 A1    Jun. 27, 2013

(30) Foreign Application Priority Data

Dec. 26, 2011    (CN) .......................... 2011 1 0440890

(51) Int. Cl.
*G06F 1/16*    (2006.01)
*G06F 3/02*    (2006.01)

(52) U.S. Cl.
CPC .................................. *G06F 3/0208* (2013.01)
USPC ............ 361/679.59; 361/679.55; 361/679.11; 361/679.12; 248/685; 248/166; 248/434; 248/439; 248/346.3

(58) Field of Classification Search
USPC ............. 248/685, 125.8, 163.1, 188.8, 274.1, 248/346.3; 361/659.59, 679.01, 679.08, 361/679.11, 679.12, 679.09, 679.55
See application file for complete search history.

(56) References Cited

U.S. PATENT DOCUMENTS

| 5,375,800 | A | * | 12/1994 | Wilcox et al. ............... 248/118.1 |
| 7,821,786 | B2 | * | 10/2010 | Hadad et al. .............. 361/679.59 |
| 7,855,883 | B2 | * | 12/2010 | Tang ........................ 361/679.55 |
| 8,050,032 | B2 | * | 11/2011 | Trang ....................... 361/679.59 |
| 8,534,619 | B2 | * | 9/2013 | Huang et al. .................. 248/166 |
| 8,544,808 | B2 | * | 10/2013 | Saad ........................ 248/346.06 |

* cited by examiner

*Primary Examiner* — Todd M Epps
(74) *Attorney, Agent, or Firm* — Novak Druce Connolly Bove + Quigg LLP

(57) ABSTRACT

A support apparatus supports an electronic device on a supporting surface. The support apparatus includes a first support leg and a second support leg. One end of the first support leg is rotatably connected to the electronic device, and the first support leg defines a receiving space therein. One end of the second support leg is rotatably connected to an opposite end of the first support leg. When in a closed state, the support apparatus is completely stowed in the electronic device. When the support apparatus is in a first inclined state, the second support leg is received in the receiving space but the support apparatus is oriented in a position obliquely unfolded from the electronic device. When in a second inclined state, the support apparatus is oriented in the position obliquely unfolded from the electronic device, but the second support leg is unfolded from the receiving space.

15 Claims, 13 Drawing Sheets

SUPPORT APPARATUS AND ELECTRONIC DEVICE EMPLOYING THE SUPPORT APPARATUS

BACKGROUND

1. Technical Field

The present disclosure relates to support apparatuses, and particularly to a support apparatus employed by an electronic device such as a keyboard.

2. Description of Related Art

Support apparatus for electronic devices such as keyboards, digital photo frames, and tablets, support the main bodies of the electronic devices and keep the main bodies at certain inclinations. However, a typical support apparatus keeps the electronic device in only one angle of inclination, and does not satisfy the requirement for multiple inclined states.

Therefore, an electronic device employing a support apparatus to overcome the above described shortcoming is desired.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will be made to the drawings to describe various embodiments in detail.

Figure 1:
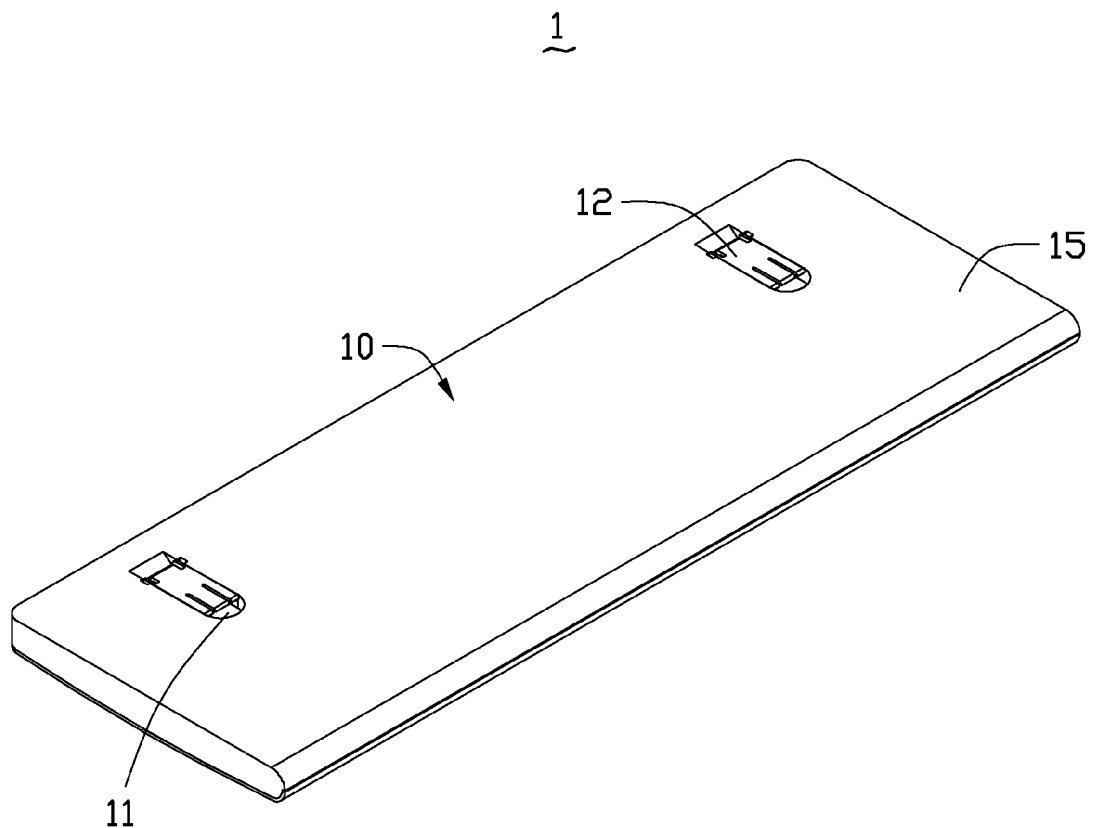
FIG. 1 is an isometric view of an electronic device (i.e., a keyboard) according to one embodiment, the electronic device including a pair of support apparatuses, wherein the electronic device is shown inverted and the support apparatuses are shown in a closed state.

Referring to FIG. 1, an electronic device 1 may be a keyboard, a notepad, a digital photo frame, or the like. In the illustration, the electronic device 1 is a keyboard. The electronic device 1 includes a main body 15 and a pair of support apparatuses 12. The main body 15 includes a cover 10. The support apparatuses 12 are mounted on the cover 10 and rotatable relative to the cover 10. The cover 10 defines a pair of first receiving spaces 11, and the support apparatuses 12 are rotatably received in the first receiving spaces 11. When the support apparatuses 12 are in a closed state, the support apparatuses 12 are completely received in the first receiving spaces 11. When each support apparatus 12 is rotated relative to the cover 10, a portion of the support apparatus 12 protrudes out of the first receiving space 11, and the support apparatus 12 is thus switched from the closed state to a first inclined state. When the support apparatus 12 is then stretched out completely, the support apparatus 12 is switched from the first inclined state to a second inclined state. Each first receiving space 11 may be a cavity recessed from a bottom surface of the cover 10. The number of the support apparatuses 12 can be arranged as needed. In the embodiment, the two support apparatuses 12 are at two opposite sides of the cover 10, to balance the electronic device 1.

Figure 2:
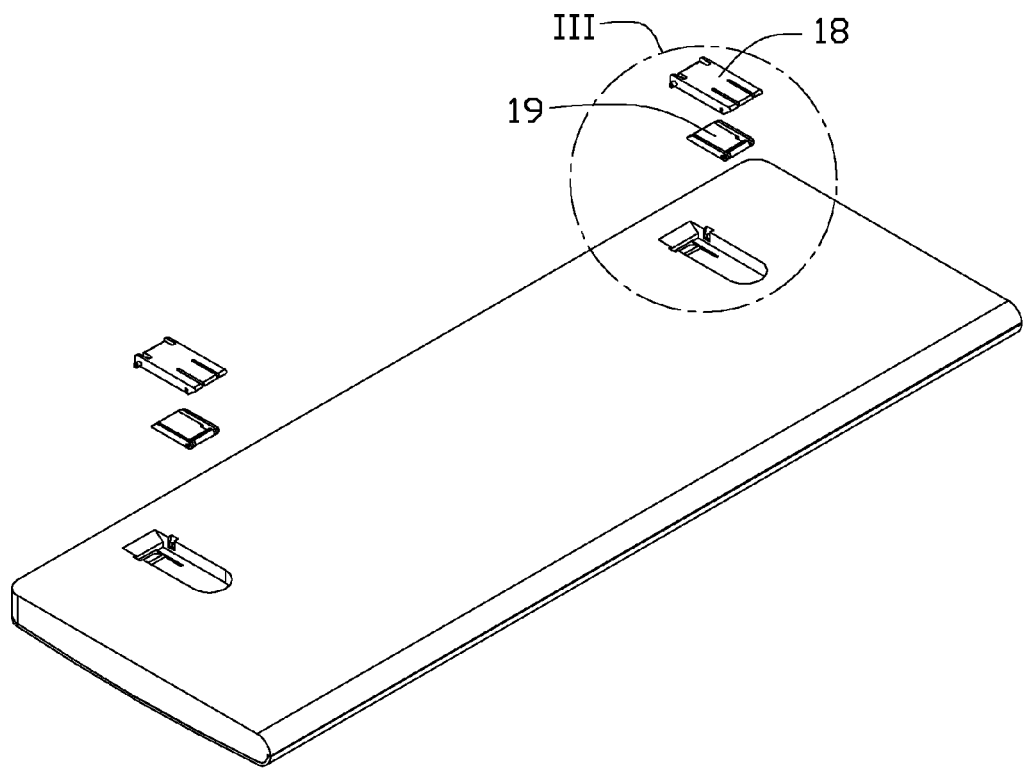
FIG. 2 is an exploded view of the electronic device of FIG. 1.
Figure 3:
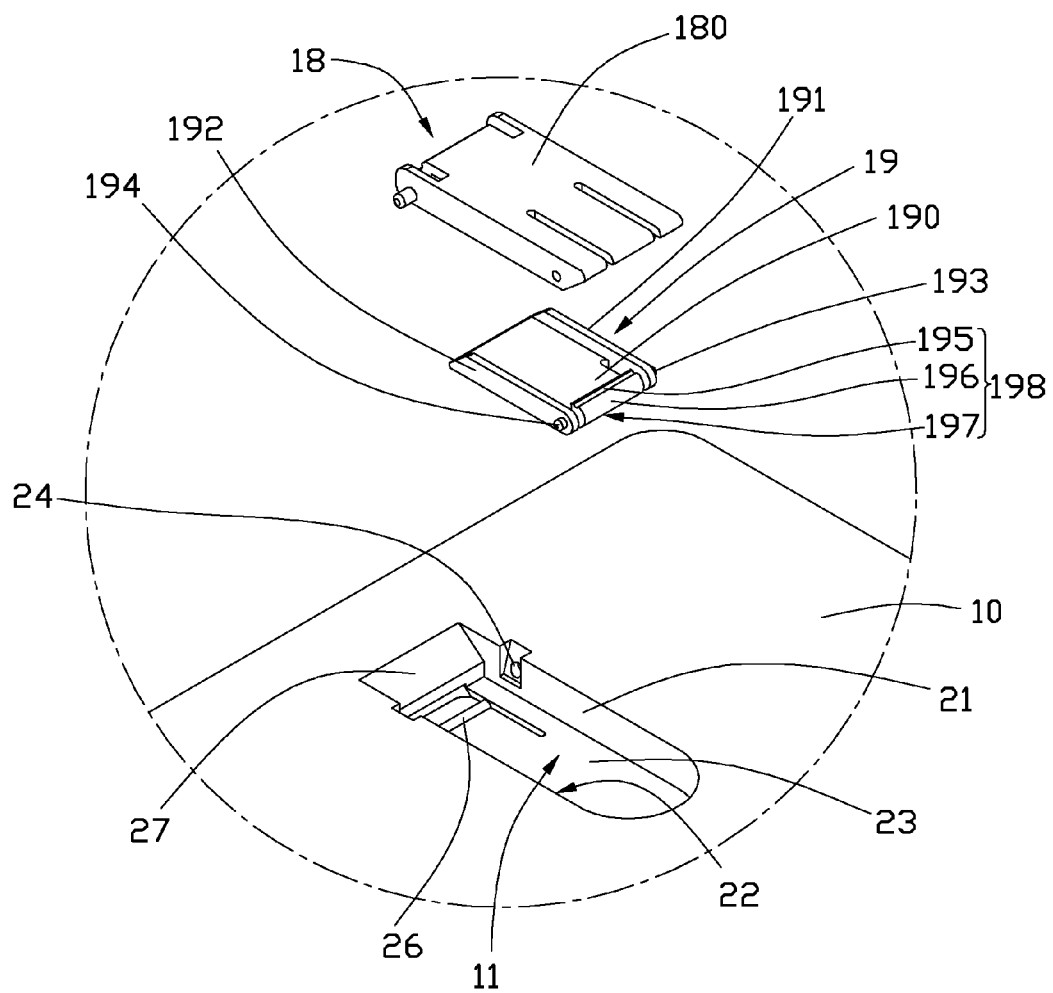
FIG. 3 is an enlarged view of a circled part III of one of the support apparatuses of FIG. 2.
Figure 4:
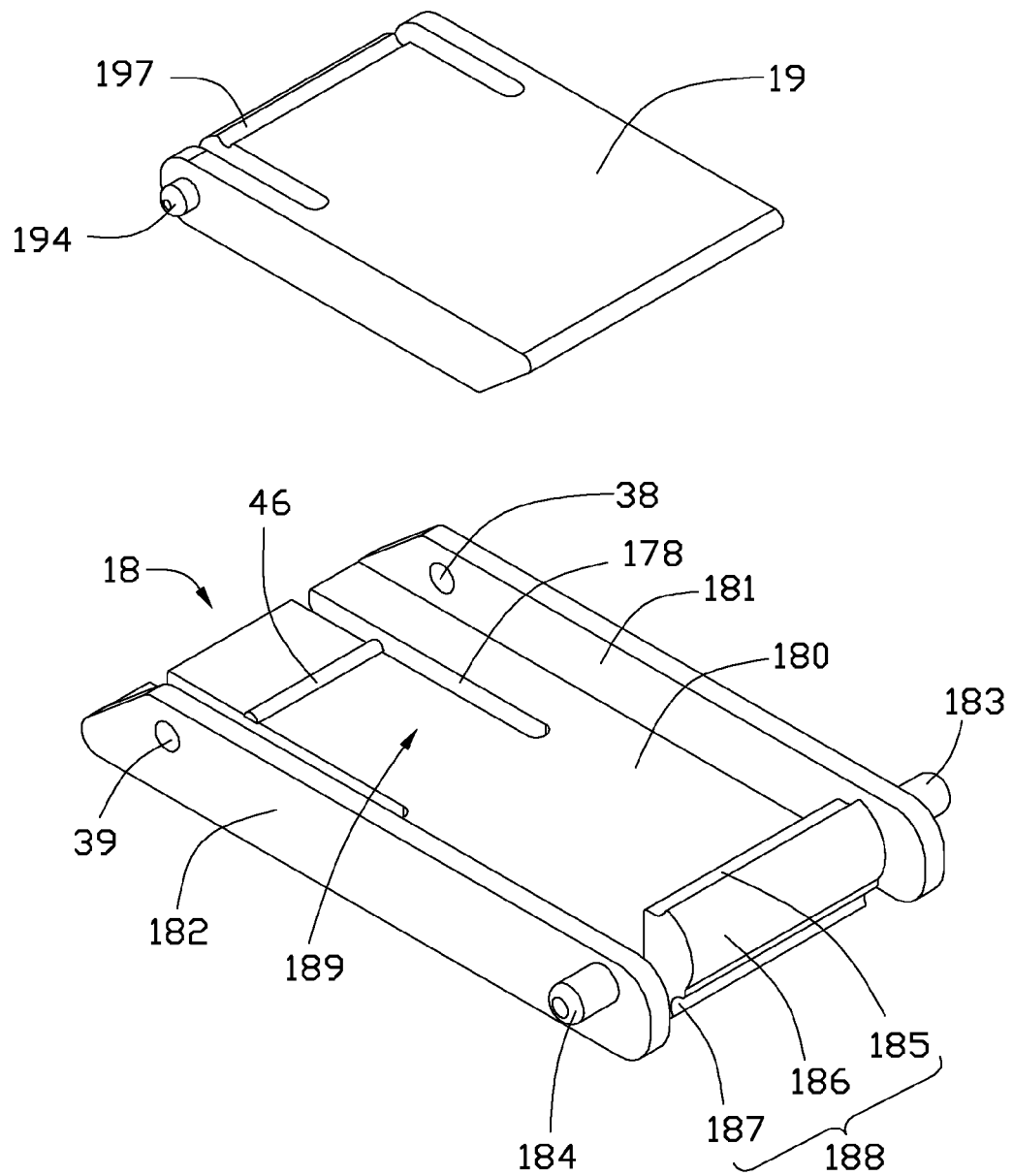
FIG. 4 is an enlarged, isometric view of some components of the support apparatus of FIG. 3.

Referring also to FIGS. 2-4, each support apparatus 12 includes a first support leg 18 and a second support leg 19. One end of the first support leg 18 is rotatably connected to the cover 10 at a side of the first receiving space 11, and the other end of the first support leg 18 is rotatably connected to one end of the second support leg 19. The other end of the second support leg 19 is a free end.

The first receiving space 11 defines a first side wall 21, a second side wall 22 spaced and opposite to the first side wall 21, and a bottom plate 23 perpendicularly connecting with the first and second side walls 21, 22. The first side wall 21 and the second side wall 22 both define a first receiving hole 24, for the first support leg 18 to pivotally engage with the first and second side walls 21, 22. The bottom plate 23 defines an elongated restriction protrusion 26 for positioning the first support leg 18 when the support apparatus 12 is in the first inclined state or in the second inclined state. The restriction protrusion 26 can be a beam extending from the surface of the bottom plate 23, or an elastic tab fastened on the bottom plate 23. In the illustrated embodiment, the restriction protrusion 26 is a beam extending from the surface of the bottom plate 23.

The first receiving space 11 further includes a third side wall 27 connecting with one end of the first side wall 21, with one end of the second side wall 22, and with the bottom plate 23. The third side wall 27 is located at the ends of the first and second side walls 21, 22 where the first receiving holes 24 are positioned. The third side wall 27 is inclined relative to the bottom plate 23. An obtuse angle is defined between the third side wall 27 and the bottom plate 23.

The first support leg 18 includes a base board 180, a first side board 181 and a second side board 182. The first side board 181 and the second side board 182 are formed on opposite sides of the base board 180. The base board 180, together with the first side board 181 and the second side board 182, cooperatively define a second receiving space 189. A first pivot 183 extends from an outside surface of the first side board 181 which faces away the second side board 182, and corresponds to one first receiving hole 24. A second pivot 184 extends from an outside surface of the second side board 182 which faces away the first side board 181, and corresponds to the other first receiving hole 24.

The first support leg 18 further includes a third side board 188. In cooperation with the restriction protrusion 26 of the main body 15, the third side board 188 positions the first support leg 18. The third side board 188 is arranged between the first side board 181 and the second side board 182. The third side board 188 connects to the base board 180, to an end of the first side board 181 and to an end of the second side board 182, wherein the end of the first side board 181 and the end of the second side board 182 are located at a same side and aligned with each other.

The third side board 188 includes a first restriction groove 185, a second restriction groove 187 and a transition surface 186. The first restriction groove 185 and the second restriction groove 187 are arranged at opposite sides of the third side board 188. The opposite sides may be a side near the base board 180, and a side far away from the base board 180. The transition surface 186 is a surface facing away from the second receiving space 189, and extends from the first restriction groove 185 to the second restriction groove 187. A transverse width of each of the first restriction groove 185 and the second restriction groove 187 matches that of the restriction protrusion 26 of the main body 15. In the embodiment, the transition surface 186 is an arcuate surface.

The first side board 181 and the second side board 182 respectively define second receiving holes 38, 39 at ends thereof far from the third side board 188. The two second receiving holes 38, 39 are aligned with each other, for the second support leg 19 to pivotally connect to the first and second side boards 181, 182. Each of the first side board 181 and the second side board 182 includes an inclined surface at an end thereof near the respective second receiving hole 38 or 39. The base board 180 defines an elongated restriction protrusion 46 at a surface facing the second receiving space 189, so as to position the second support leg 19. The restriction protrusion 46 can be a beam extending from the surface of the base board 180, or an elastic tab fastened on the base board 180. In the illustrated embodiment, the restriction protrusion 46 is a beam extending from the surface of the base board 180.

In one embodiment, the base board 180 defines two slits 178 parallel to the first side board 181 and the second side board 182. The restriction protrusion 46 is arranged between the two slits 178, and is perpendicular to the two slits 178.

The second support leg 19 includes a base plate 190, a first side plate 191, and a second side plate 192. The first side plate 191 and the second side plate 192 connect with opposite sides of the base plate 190. The first side plate 191 has a first pivot 193 arranged on an outside surface thereof, corresponding to the second receiving hole 38 of the first support leg 18. The second side plate 192 has a second pivot 194 arranged on an outside surface thereof, corresponding to the second receiving hole 39 of the first support leg 18. The second support leg 19 is rotatable around the first and second pivots 193, 194.

The second support leg 19 further includes a third side plate 198. The third side plate 198 positions the second support leg 19 in cooperation with the restriction protrusion 46 of the first support leg 18. The third side plate 198 is arranged between the first side plate 191 and the second side plate 192. The third side plate 198 extends from the base plate 190, and connects with the first side plate 191 and the second side plate 192. The third side plate 198 includes a first restriction groove 195, a second restriction groove 197, and a transition surface 196. The first restriction groove 195 and the second restriction 197 are arranged on opposite sides of the third side plate 198, wherein the opposite sides may be a side near the base plate 190 and a side far away from the base plate 190. A transverse width of each of the first restriction groove 195 and the second restriction groove 197 matches with that of the restriction protrusion 46 of the first support leg 18.

The heights of each of the first and second side plates 191, 192 of the second support leg 19 are less than those of the first and second side boards 181, 182 of the first support leg 18.

Thereby, the second support leg 19 can be completely received in the second receiving space 189 of the first support leg 18.

Figure 5:
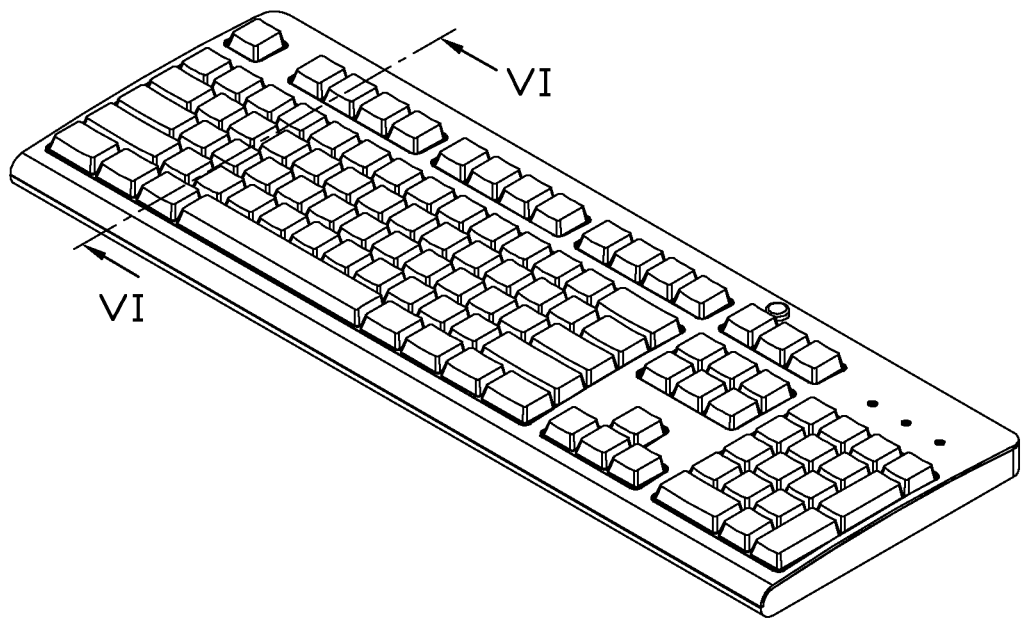
FIG. 5 is an isometric view of the electronic device of FIG. 1, showing the electronic device right-side-up.
Figure 6:
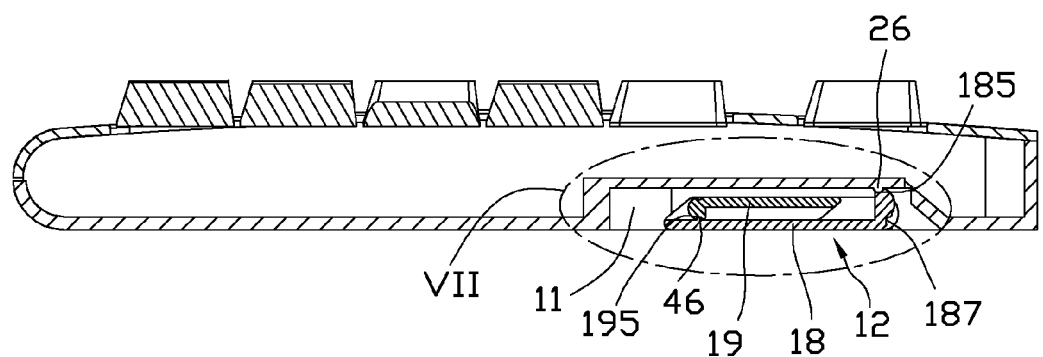
FIG. 6 is a sectional view of FIG. 5 along line VI-VI thereof, showing one of the support apparatuses of the electronic device.
Figure 7:
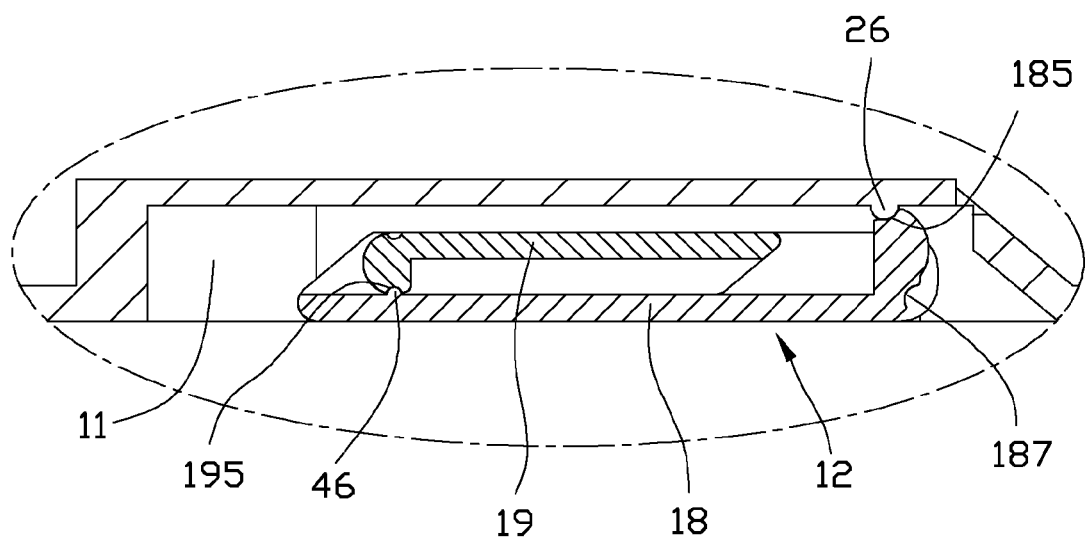
FIG. 7 is an enlarged view of a circled part VII of FIG. 6.

Referring also to FIGS. 5-7, when the support apparatus 12 is in the closed state, the first restriction groove 185 of the first support leg 18 has the restriction protrusion 26 matingly received and engaged therein. The first restriction groove 195 of the second support leg 19 has the restriction protrusion 46 of the first support leg 18 matingly received and engaged therein. The second support leg 19 is thus received and held in the second receiving space 189.

Figure 8:
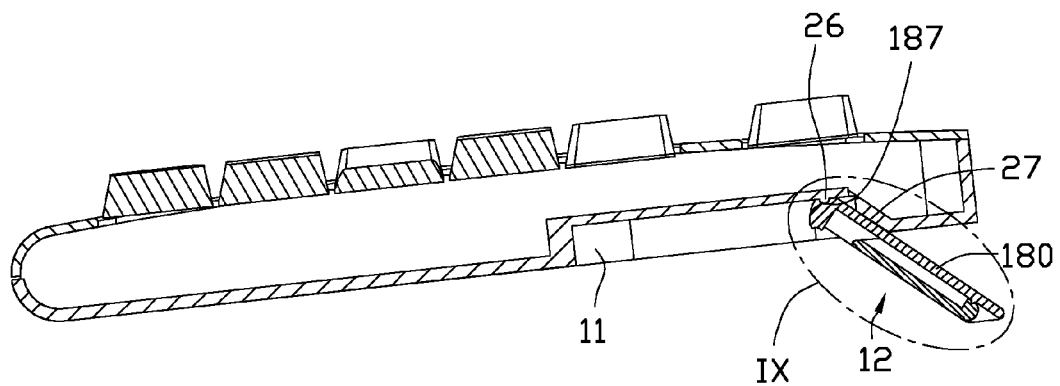
FIG. 8 is similar to FIG. 6, but showing a first support leg of the support apparatus unfolded from the electronic device.
Figure 9:
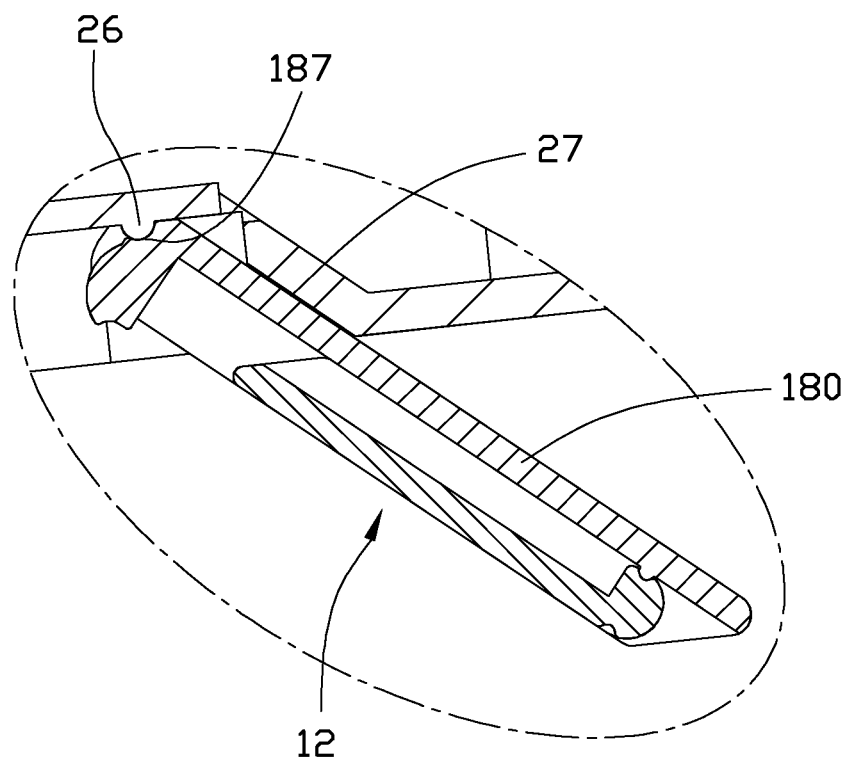
FIG. 9 is an enlarged view of a circled part IX of FIG. 8.
Figure 10:
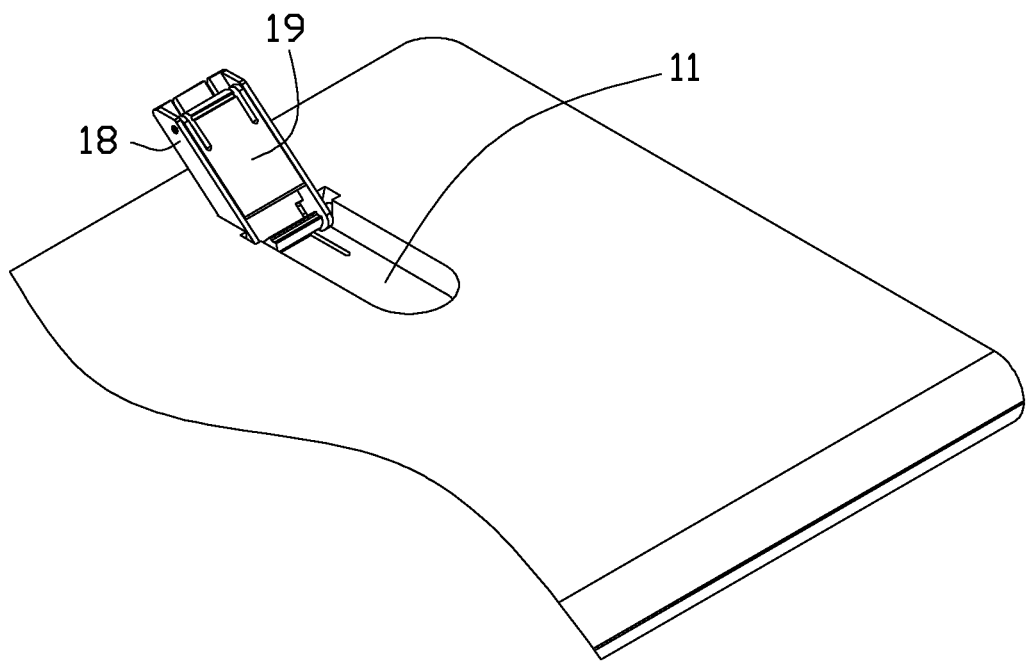
FIG. 10 is similar to a view of part of the electronic device of FIG. 1, but showing the first support leg of one support apparatus unfolded from the electronic device.

Referring also to FIGS. 8-10, when the support apparatuses 12 are required to be switched from the closed state to the first inclined state, the first support leg 18 of each support apparatus 12 is pulled and rotated so that it protrudes out of the first receiving space 11. The first support leg 18 is inclined and can stand on a supporting surface (not shown). The second restriction groove 187 of the first support leg 18 has the restriction protrusion 26 matingly received and engaged therein. The third side wall 27 contacts the base board 180. The second support leg 19 remains received in the second receiving space 189.

Figure 11:
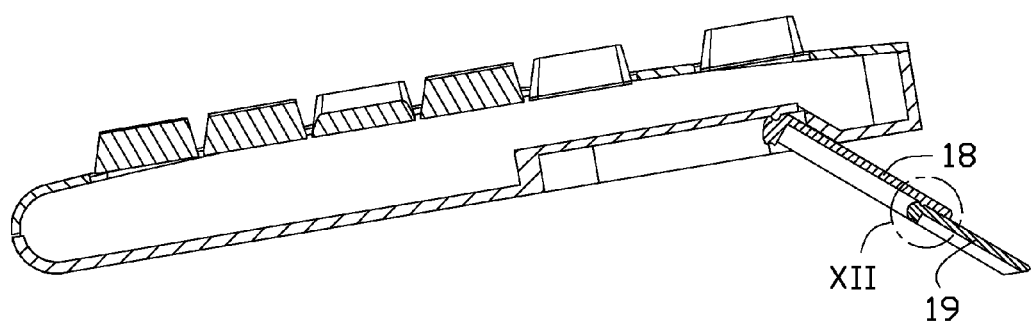
FIG. 11 is similar to FIG. 8, but showing a second support leg of the support apparatus unfolded from the first support leg.
Figure 12:
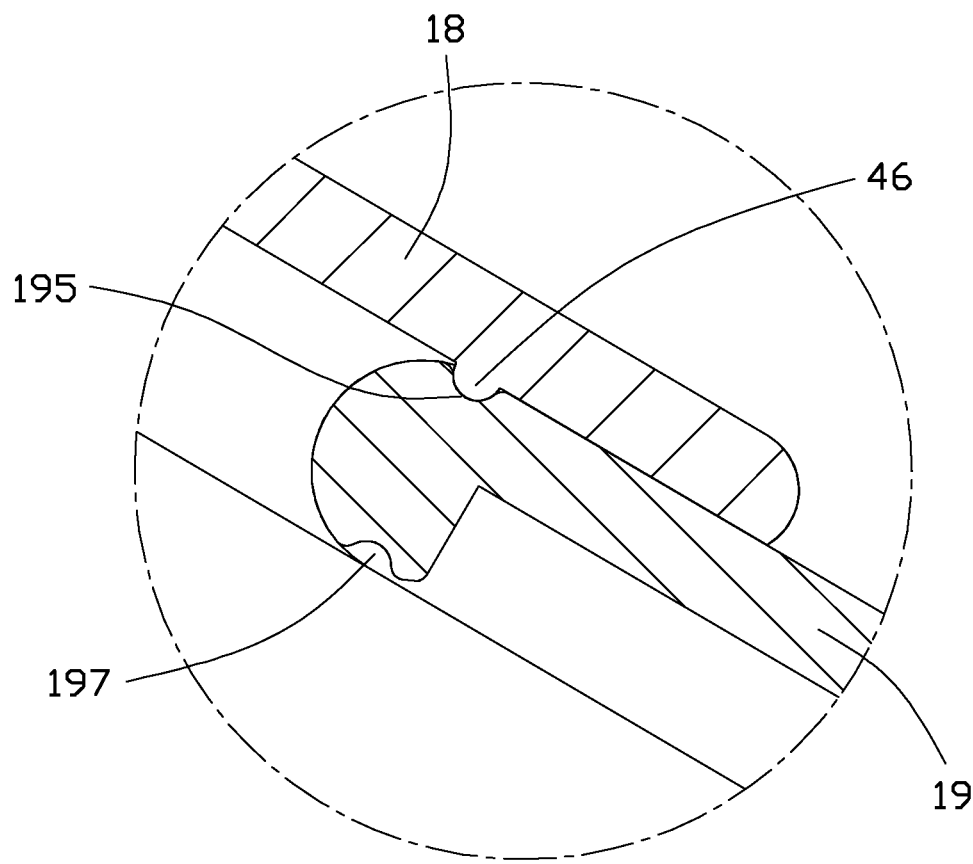
FIG. 12 is an enlarged view of a circled part XII of FIG. 11.
Figure 13:
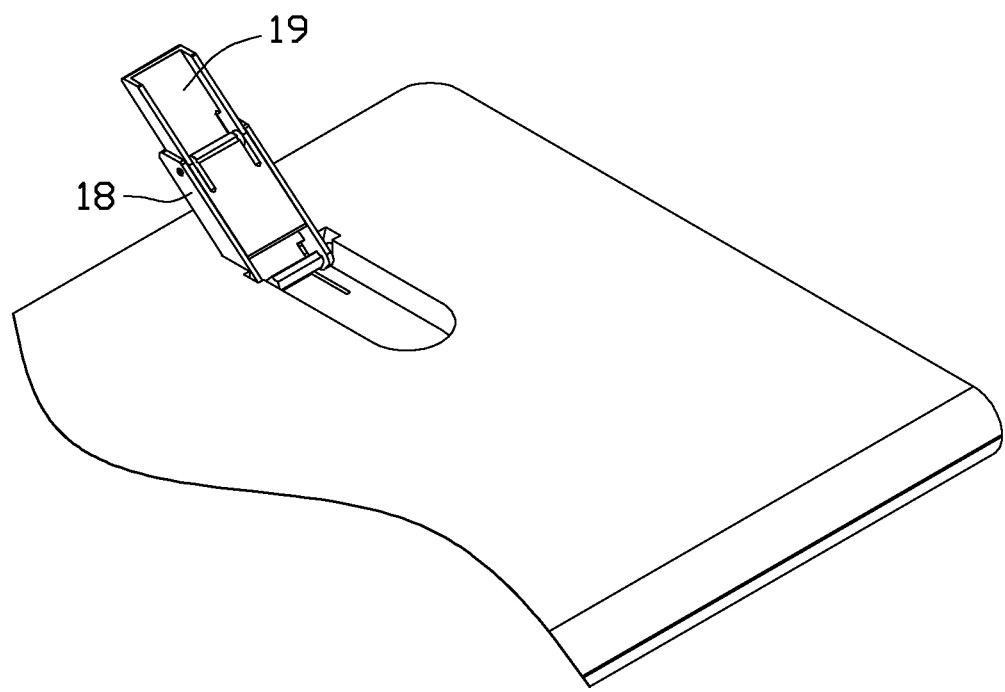
FIG. 13 is similar to FIG. 10, but showing the second support leg of the support apparatus unfolded from the first support leg.

Referring also to FIGS. 11-13, when the support apparatuses 12 are required to be switched from the first inclined state to the second inclined state, the second support leg 19 of each support apparatus 12 is rotated relative to the first support leg 18 about the first and second pivots 193, 194, and is unfolded out of the second receiving space 189. When the support apparatus 12 is in the second inclined state, the second restriction groove 197 of the second support leg 19 has the restriction protrusion 46 of the first support leg 18 matingly received and engaged therein.

In summary, each support apparatus 12 of the electronic device 1 includes the first support leg 18 and the second support leg 19. The electronic device 1 is thus able to be stably positioned on a supporting surface at either of two different inclinations as selected by a user, the two different inclinations corresponding to the first and second inclined states of the support apparatuses 12.

It is to be understood that even though numerous characteristics and advantages of the present embodiments have been set forth in the foregoing description, together with details of the structures and functions of the embodiments, the disclosure is illustrative only; and changes may be in detail, especially in the matters of shape, size and arrangement of parts within the principles of the embodiments to the full extent indicated by the broad general meaning of the terms in which the appended claims are expressed.

What is claimed is:

1. A support apparatus for supporting an electronic device on a supporting surface, the support apparatus comprising:
   a first support leg defining a receiving space, one end of the first support leg configured to be rotatably connected to the electronic device; and
   a second support leg, one end of the second support leg being rotatably connected to an opposite end of the first support leg;
   wherein when the support apparatus is in a closed state, the second support leg is received in the receiving space and the support apparatus is oriented in a position corresponding to a position completely stowed in the electronic device;
   when the support apparatus is in a first inclined state, the second support leg is received in the receiving space but the support apparatus is oriented in a position corresponding to a position obliquely unfolded from the electronic device; and when the support apparatus is in a second inclined state, the support apparatus is oriented in the position corresponding to the position obliquely unfolded from the electronic device, but the second support leg is unfolded from the receiving space.

2. The support apparatus of claim 1, wherein when the support apparatus switches from the first inclined state to the second inclined state, the second support leg is rotated relative to the first support leg and protrudes out of the receiving space.

3. The support apparatus of claim 2, wherein the first support leg comprises a first side board, a second side board and a base board, the first side board and the second side board extend from opposite sides of the base board, and the first side board, the second side board and the base board cooperatively define the receiving space therebetween.

4. The support apparatus of claim 3, wherein the first support leg further comprises a third side board arranged between the first side board and the second side board, and the third side board is configured for engaging with the electronic device when the first support leg is in each of two selectable orientations and thereby positioning the first support leg such that the support apparatus is in a selected one of the closed state and the first and second inclined states.

5. The support apparatus of claim 3, wherein the first support leg further comprises a restriction protrusion arranged in the receiving space at the end of the first support leg that is rotatably connected to the second support leg.

6. The support apparatus of claim 5, wherein the second support leg comprises a side plate at the end thereof that is rotatably connected to the first support leg, and the side plate is configured for engaging with the restriction protrusion of the first support leg in each of two selectable orientations of the second support leg such that the support apparatus is in a selected one of the closed and first inclined states and the second inclined state.

7. The support apparatus of claim 6, wherein the side plate comprises a first restriction groove, a second restriction groove and a transition surface, the first restriction groove and the second restriction groove are arranged at opposite sides of the side plate, and the transition surface is arranged between the first and second restriction grooves; when the support apparatus is in each of the closed state and the first inclined state, the first restriction groove engagingly receives the restriction protrusion; and when the support apparatus is in the second inclined state, the second restriction groove engagingly receives the restriction protrusion.

8. An electronic device, comprising:
a cover defining a first receiving space in a surface thereof; and
a support apparatus movably connected to the cover and configured to support the electronic device on a supporting surface, the support apparatus comprising:
a first support leg defining a second receiving space, one end of the first support leg rotatably connected to the cover at a side of the first receiving space; and
a second support leg, one end of the second support leg rotatably connected to an opposite end of the first support leg;
wherein when the support apparatus is in a closed state, the second support leg is received in the second receiving space and the support apparatus is substantially received in the first receiving space;
when the support apparatus is in a first inclined state, the second support leg is received in the second receiving space but the first support leg is obliquely unfolded from the first receiving space; and
when the support apparatus is in a second inclined state, the first support leg is obliquely unfolded from the first receiving space and the second support leg is unfolded from the second receiving space.

9. The electronic device of claim 8, wherein the cover comprises a bottom plate, the bottom plate defines a first restriction protrusion in the first receiving space, and the first restriction protrusion is engagable with the first support leg when the first support leg is in each of two selectable orientations and thereby positions the first support leg such that the support apparatus is in a selected one of the closed state and the first and second inclined states.

10. The electronic device of claim 9, wherein the first support leg comprises a first side board, a second side board and a base board, the first side board and the second side board extend from opposite sides of the base board, and the first side board, the second side board and the base board cooperatively define the second receiving space therebetween.

11. The electronic device of claim 10, wherein the first support leg further comprises a third side board arranged between the first side board and the second side board at an end of the first support leg that is rotatably connected to the cover, and the third side board is configured for engagingly receiving the first restriction protrusion when the first support leg is in each of the two selectable orientations.

12. The electronic device of claim 11, wherein the third side board comprises a first restriction groove, a second restriction groove and a transition surface, the first restriction groove and the second restriction groove are arranged at opposite sides of the third side board, and the transition surface is arranged between the first and second restriction grooves; when the support apparatus is in the closed state, the first restriction groove engagingly receives the first restriction protrusion; and when the support apparatus is in each of the first and second inclined states, the second restriction groove engagingly receives the first restriction protrusion.

13. The electronic device of claim 12, wherein the first support leg further comprises a second restriction protrusion arranged in the first receiving space at the end of the first support leg that is rotatably connected to the second support leg.

14. The electronic device of claim 13, wherein the second support leg comprises a side plate at the end thereof that is rotatably connected to the first support leg, and the side plate is configured for engaging with the second restriction protrusion of the first support leg in each of two selectable orientations of the second support leg such that the support apparatus is in a selected one of the closed and first inclined states and the second inclined state.

15. The electronic device of claim 14, wherein the side plate comprises a first restriction groove, a second restriction groove and a transition surface, the first restriction groove and the second restriction groove are arranged at opposite sides of the side plate, and the transition surface is arranged between the first and second restriction grooves; when the support apparatus is in each of the closed state and first inclined state, the first restriction groove engagingly receives the second restriction protrusion; and when the support apparatus is in the second inclined state, the second restriction groove engagingly receives the second restriction protrusion.

* * * * *